United States Patent [19]

Weiler et al.

[11] Patent Number: 4,781,265

[45] Date of Patent: Nov. 1, 1988

[54] INTERMITTENT CHANGE-OVER CONTROL FROM TWO-WHEEL DRIVE TO FOUR-WHEEL DRIVE

[75] Inventors: Werner Weiler, Lichtenwald; Arno Röhringer, Ditzingen, both of Fed. Rep. of Germany

[73] Assignee: Daimler-Benz Aktiengesellschaft, Stuttgart, Fed. Rep. of Germany

[21] Appl. No.: 64,079

[22] Filed: Jun. 19, 1987

[30] Foreign Application Priority Data

Jun. 25, 1986 [DE] Fed. Rep. of Germany ....... 3621225

[51] Int. Cl.$^4$ .............................................. B60K 23/08
[52] U.S. Cl. .................................... 180/233; 180/197; 180/247; 192/54; 364/426.03
[58] Field of Search ............... 180/233, 247, 248, 197, 180/252; 364/426; 192/103 F, 103 R, 54

[56] References Cited

U.S. PATENT DOCUMENTS 4,511,014  4/1985  Makita ................................. 364/426

FOREIGN PATENT DOCUMENTS

2805619  8/1978  Fed. Rep. of Germany ...... 180/197
12827    1/1983  Japan ................................... 180/233

Primary Examiner—David M. Mitchell
Assistant Examiner—Everett G. Diederiks, Jr.
Attorney, Agent, or Firm—Barnes & Thornburg

[57] ABSTRACT

In a vehicle with a permanently active rear-axle drive train and with a front-axle drive train which can be connected via an electrohydraulically controllable clutch and a power take-off gear, and which is connected each time for a specific period of a few seconds when the drive slip in the rear-axle drive train exceeds a predetermined threshold value. A torque direction sensor responds to pulling and pushing stresses in the front-axle drive train and which generates electrical output signals characteristic of such stresses. These output signals are used with the output signals from a forward-reverse motion sensor in a logic circuit, in such a way that the clutch is released when admissibly high stresses occur in the front-axle drive train within the connection period, and the clutch is engaged again when these stresses have diminished. The torque direction sensor comprises a rotary-slide reversing valve, the piston of which is connected fixedly in terms of rotation to the cardan shaft of the connectable drive train, on the one hand, and to the output gear wheel of the power take-off gear via a torsion rod, on the other hand. For alternative directions of the torque in the connectable drive train, this valve assumes alternative through-flow positions, in each of which a dynamic pressure in one of two flow branches is produced. The monitoring of the pressures in the two flow branches by a pressure/voltage converter device generates the torque direction signals necessary for logic circuit.

10 Claims, 3 Drawing Sheets

INTERMITTENT CHANGE-OVER CONTROL FROM TWO-WHEEL DRIVE TO FOUR-WHEEL DRIVE

BACKGROUND AND SUMMARY OF THE INVENTION

The invention relates to a control device for the intermittent change-over of a vehicle drive from two-wheel drive via a permanently driven vehicle axle to four-wheel drive. This change-over taking place as a result of the closing of an electrically or electrohydraulically controllable clutch which, in the closed state, couples the permanently active drive train in drive terms to the connectable drive train acting on the further vehicle wheels. This change-over is triggered when the drive slip of at least one of the wheels of the permanently driven vehicle axle exceeds a predetermined threshold value. An electronic control unit generates control signals necessary for controlling the clutch as a result of a processing of electrical output signals from speed sensors characteristic of the circumferential speeds of the wheels belonging to the respective vehicle axles.

A control device of this type is shown in German Offenlegungsschrift No. 3,427,725 for a vehicle with a permanently active front-axle drive train and a connectable rear-axle drive train. For coupling the rear axle-drive train in drive terms to the power take-off gear or the front-axle drive train, there is a slipping clutch of controllable closing force, which is controlled of the electronic control unit in such a way that the slip of the permanently driven vehicle wheels is always a predeterminable amount greater than the slip of the vehicle wheels driven by the connectable drive train.

Disadvantages of this known control device are, on the one hand, the high wear occurring in the region of the slipping clutch and, on the other hand, to be considered more critical, the loss of driving stability resulting from the fact that the permanently driven vehicle axle is set to a higher drive slip in relation to the connectable driving axle. This is a disadvantage particularly when the permanently active drive train is the rear-axle drive train.

This last-mentioned disadvantage also plagues a purely hydraulically controlled device acting in a similar way, as shown in from German Offenlegungsschrift No. 2,805,692 for a vehicle with a permanent rear-axle drive and intended for connecting a front-axle drive train to a permanently active rear-axle drive train. In this device, the change-over to four-wheel drive likewise taking place when the drive slip of the permanently driven rear wheels exceeds a specific threshold value. The two drive trains are coupled for four-wheel operation by a pressure-controlled multiple-disc clutch which, although it can "play" between the closed and released operating states during forward motion, nevertheless has to remain closed for reversing. In this case, during cornering, considerable stresses can arise once again in the drive train because of the different cornering radii for the steerable front wheels and the rear wheels of the vehicle. In extreme cases, particularly when the cornering radii are narrow and there are high adhesion coefficients between the vehicle wheels and the road, these stresses can lead to considerable distortion in the drive train as a whole and consequently result in damage to the drive train.

The object of the invention is, therefore, to provide an improved control device such that, in four-wheel operation, both good driving stability and effective protection of the drive train against distortion stresses during cornering are obtained.

According to the invention, this object is achieved by providing a torque direction sensor which provides logic output signals for the two possible alternative directions of torque in effect in the connectable drive train and a driving direction sensor for providing alternative logic level output signals for the alternative forward and reverse driving directions. The electronic control for the valve controlling the clutch which connects and disconnects the connectable drive train receives signals from the torque direction sensor and the driving direction sensor and the wheels to control the clutch as follows. The electrical control unit generates a signal for a minimum period of activation to close the clutch and connect the connectable drive train when the slip threshold for at least one of the wheels of the permanently driven vehicle axle exceeds a predetermined threshold. The control electronics further controls the opening or closing of the clutch depending on the signals from the torque direction sensor and the driving direction sensor as will be more fully explained below.

The control device according to the invention provides the following functional properties and benefits, as explained by the example of a vehicle with a permanent rear-axle drive:

A signal causing the front-axle drive train to be connected to the permanent rear-axle drive train, after being triggered because a drive-slip threshold on the rear axle has been exceeds, is maintained for a minimum period of time which amounts to at least a few seconds, for example 3 to 10 seconds. This period is very much greater than the minimum periods of a few 100 milliseconds which are necessary for adjusting and monitoring slip values and in which the particular state of motion of the vehicle wheels could be checked. Consequently, if appropriate, a change back to two-wheel drive could be made. Lengthening the periods of time in which the additional drive train is connected makes it possible to check the condition of the road. Thus, the periods in which a drive slip impairing driving stability could build up on the permanently driven rear axle, are drastically reduced, thereby achieving altogether a considerable gain in terms of driving stability.

The connectable front-axle drive train is disconnected within the longer period of time only when and as long as an output signal from the torque direction sensor of the front-axle drive train indicates that the torque in the connected drive train has a direction, representing a deceleration of the vehicle, as seen in the driving direction. Such signals are generated by the torque direction sensor, when, during forward cornering, an accelerating torque acts on the front wheels as a result of the adhesion between the road and the front wheels and the larger radii of their tread paths. But because of the said adhesion the front wheels cannot follow this accelerating torque or can only follow it insufficiently. Thus, a pulling moment builds up in the front-axle drive train. Such signals are also generated when, during cornering in reverse, a pushing moment occurs in the front-axle drive train for the reasons mentioned. For the length of time such moments occur, the clutch is then released within the predetermined connection period, and it thereby becomes possible to reduce the moments which would otherwise lead to dangerous stresses in the drive train. In cornering situations, during which, within the connection period, the vehicle runs over regions of the road with sharply changing adhesion coefficients, the best possible compromise between driving stability and the protection of the drive train as a whole is achieved. In a cornering situation, in which, after the front-axle drive train has initially been connected, the vehicle runs over regions of the road with a uniformly high adhesion coefficient during a further portion of the connection period, torsional stresses which would otherwise occur are reduced according to need.

The torque direction sensor which can be used within the framework of the control device according to the invention includes a three by three way valve with a middle and two alternate flow through positions which is positioned as a result of the alternative directions of torque effective in the connectable drive train. In the middle position of the valve corresponding to a torque-free state of the connectable drive train, the two pressure outlets are cut off from the control pressure source. In the two flow through positions, one of the two outlets is connected to the inlet pressure and the other is shut off. If there is already a hydraulic auxiliary-pressure source on the vehicle it is possible to produce this torque direction sensor by means of a simple hydraulic directional valve and a pressure/voltage converter device consisting, for example, of simple pressure switches.

The three/three-way valve is a rotary-slide valve including a piston supported on the output gear by at least one resilient or torsional element for restoring force increasing counter to the relative movement of the piston and the output gear of the power take off gear. Stops are provided to define a limited angular sector defining the positions of the middle and the two alternating positions. This provides a space-saving, simple and functionally reliable design of the valve of the torque direction sensor, and this can be incorporated in the power take-off gear. By making the torsional rod one piece with the piston and connected fixedly in terms of rotation to the output gear wheel and by projecting into the bore located in the outside shaft piece of the output gear wheel.

The pressure/voltage converter device is designed especially favorably in functional terms as a flow-resistance measuring bridge with preferably symmetrical parallel flow branches and with a simple differential-pressure switch as a signal transmitter. The output signals of the differential pressure switch are combined in a simple logical circuit with the forward/reverse motion signals of the driving-direction sensor, to form the signals for the appropriate activation of an electrohydraulically controlled clutch, which includes a solenoid fluid valve connecting a fluid pressure source with a fluid clutch.

The control device according to the invention is equally suitable for vehicles with a permanent rear-axle drive and a connectable front-axle drive and for vehicles with a permanent front-axle drive and connectable rear-axle drive.

Other objects, advantages and novel features of the present invention will become apparent from the following detailed description of the invention when considered in conjunction with the accompanying drawings.

DETAILED DESCRIPTION OF THE DRAWINGS

Figure 1:
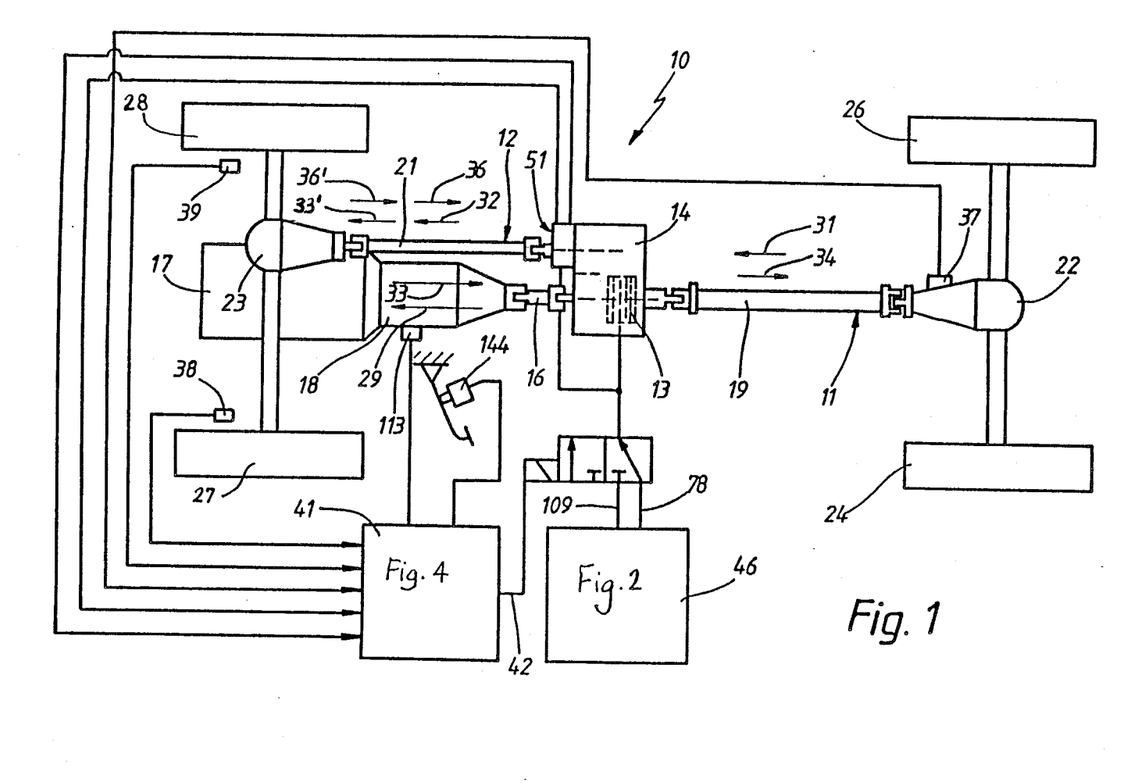
FIG. 1 is a simplified diagrammatic representation of the drive train of a vehicle with a permanent rear-axle drive and a front-axle drive train connectable via a controllable clutch and a power take-off gear, and with a control device according to the invention for the intermittent change-over from two-wheel to four-wheel drive of a vehicle or the change back to two-wheel drive.

FIG. 1 shows a vehicle, designated as a whole by 10, in terms of the functionally essential elements of its entire drive train which comprises, as a main drive, a permanently active rear-axle drive train, designated as a whole by 11, and a front-axle drive train 12 which can be connected and disconnected automatically according to need. The front axle drive train 12 can be coupled to the rear-axle drive train 11 by closing and release of an electrohydraulically controlled clutch 13 via a power take-off or change gear 14. The torque produced at the output shaft 16 of the transmission 18 coupled to the vehicle engine 17 is distributed by take-off gear 14 to the rear-axle drive train 11 and to the front-axle drive train 12 in the ratio of 1:1. The torques transmitted to the cardan shafts 19 and 21 from the power take-off gear 14 are transmitted to the rear wheels 24, 26 and the front wheels 27, 28 in the usual ways by means of a rear-axle differential 22 and a front-axle differential 23, respectively. The torque directions occurring during forward motion at the output shaft 16 of the transmission 18 and at the cardan shafts 18 and 21 are represented by the torque direction arrows 29 and 31, and 32 respectively. The torques effective during reversing in four-wheel operation are represented correspondingly by the arrows 33 and 34, and 36 respectively pointing in the opposite direction.

In normal operation, the vehicle is only driven via the rear-axle drive train 11, with the clutch 13 released. As a result of the automatically controlled closing of the clutch 13, the front-axle drive train 12 is connected, as soon as the drive slip occurring on the rear wheels 24, 26 is greater than a predetermined threshold value of, for example 3%.

To detect a drive slip of the rear wheels, there is only a single speed sensor 37 generating a voltage signal which is characteristic of the rotational frequency of the cardan shaft 19 of the rear-axle drive train 11 and which is therefore a measure of the sum of the circumferential speeds of the rear wheels 24 and 26. The output signal from the rear-axle speed sensor 37 is compared with the output signals from two further speed sensors 38 and 39 which are each assigned individually to the front wheels 27 and 28 in order to monitor the circumferential speeds of the front wheels.

The speed comparison is carried out in a way known per se in an electronic control unit 41 which continuously compares the slip of the driven vehicle wheels with the said threshold value. As soon as this threshold value is exceeded, control unit 41 generates at a control output 42, for a minimum period of 3 to 10 seconds, an output signal. The output signal on control output 42 controls a solenoid valve 43 to assume a through-flow one position, in which a control-pressure space 44 (FIG. 2) of the clutch 13 is subjected to the high outlet pressure of an auxiliary-pressure source designated as a whole by 46, indicated only diagrammatically in FIG. 1, but shown in more detail in FIG. 2. As a result, the clutch 13 is closed and the front-axle drive train 12 is coupled to the rear-axle drive train 11. The relatively long duration of a control signal, or four-wheel operating cycle time produces the effect that in a multiplicity of driving situations the four-wheel operating state has to be maintained only for the period of the cycle.

If the vehicle corners while the front-axle drive train 12 is connected, and the adhesion coefficient between the road and the driven vehicle wheels changes from low to high then, since the front wheels 27 and 28 run on larger cornering radii than the rear wheels 24 and 26, a pushing moment arises in the front-axle drive train in the direction of the arrow 36'. Because of the power-positive coupling of the two drive trains 11 and 12 this leads to stresses in the region of the power take-off gear and the cardan shaft 21 of the front-axle drive train 12. The higher the adhesion coefficients effective between the driven vehicle wheels and the road are, the less this stress can be compensated, that is to say the less such stresses can be absorbed by a slip of the vehicle wheels. In extreme cases these can result in fracture of the cardan shaft 21 and/or damage to the power take-off gear 14. The same applies accordingly to a reversing situation in which a pulling moment arises, which takes effect in the direction of the arrow 32' and which cannot be compensated for in the front-axle drive train 12.

Figure 2:
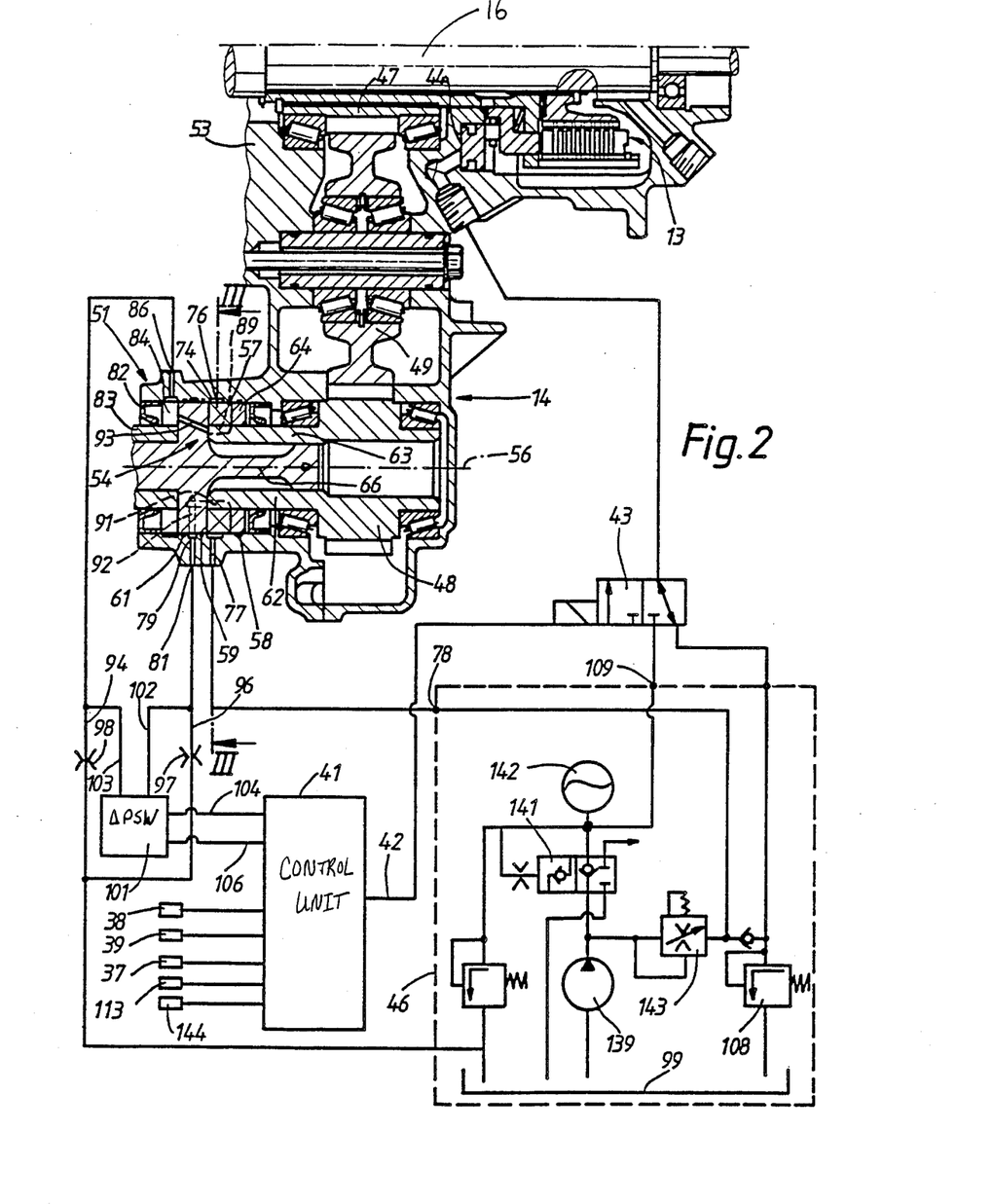
FIG. 2 is a schematic of the control device according to FIG. 1, especially a torque direction sensor, in a section along a sectional plane containing the axis of rotation of the output shaft of the power take-off gear, and of the pressure-supply and electronic control elements of the control device.

To prevent damage to the drive train which is possible as a result of such additional moments or stresses, the control device causing the closure and release of the clutch 13 is designed in detail as follows:

The power take-off gear 14, including the electrohydraulically controllable clutch 13 designed as a multiple-disc clutch, is a well known design. It includes driving gear wheel 47 couplable fixedly in terms of rotation to the output shaft 16 of the transmission 18 as a result of the closing of the clutch 13. An intermediate wheel 49 meshes with this driving gear wheel 47, and an output gear wheel 48 meshes with the intermediate wheel 49. A torque direction sensor, designated as a whole by 51, generates electrical output signals when stresses of the above-described type occur in the front-axle drive train 12 during forward or reverse cornering. The processing of the signals, together with a further signal characteristic of the driving direction by the electronic control unit 41, produces control signals which trigger a drop of the output signal controlling the clutch so that it assumes its closed state, when and as long as pulling or pushing moments exceeding a threshold valve considered admissible to take effect in the front-axle drive train 12.

In the specific exemplary embodiment illustrated, the torque direction sensor 51 is designed as a hydraulic three/three-way rotary-slide valve, the housing 52 of which is incorporated in the housing 53 of the power take-off gear 14. The piston 54 of the rotary-slide valve 51 is mounted rotatably in a bore 57 of the valve housing 51. The bore 57 is coaxial to the axis of rotation 56 of the output gear wheel 48 of the power take-off gear 14, and is sealed off in bore 57 by 0-ring gaskets 58, 59 and 61. The piston 54 is connected fixedly in terms of rotation to the cardan shaft 21 of the front-axle drive train via a universal joint not shown in FIG. 2. The piston 54 is formed as a hallow cylinder on its side facing the output gear wheel 48 of the power take-off gear 14.

A casing 64 surrounds in a sleeve-like manner an end portion 62 of the bearing shaft 63, and mounts the output gear wheel 48 in the housing 53 on the same side as the valve 51. The annular end face of the bearing shaft 63 rests slidingly against the inner face of the piston 54. This inner face forms the hollow cylinder's bottom surface. The casing piece 64 itself rests slidingly against the outer cylindrical surface of the bearing shaft 63 of the output gear wheel 48.

A resilient element or torsion rod 66, is made in one piece with the valve piston 54 and projects axially into the hollow tube bearing shaft 63 of the output gear wheel 48. The torsion rod 66 is connected fixedly in terms of rotation at its inner end to the output gear wheel 48 of the power take-off gear 14, for example by an external toothing meshing with an internal toothing of the bearing shaft 63. The valve piston 54 can rotate relative to the output gear wheel 48. The relative rotary movements are counteracted by restoring forces exerted by the torsion rod 66 and correspondingly increasing in proportion to the increasing deflection.

Figure 3:
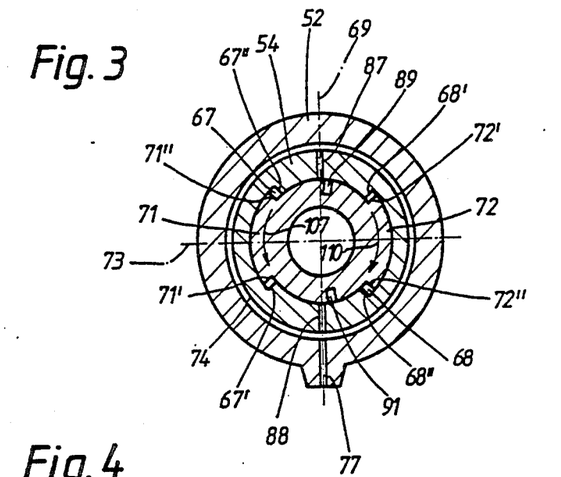
FIG. 3 is a crossectional view taken along the plane III—III of a rotary slide valve of the torque direction sensor according to FIG. 2.

For a further explanation of the design of the torque direction sensor 51, reference will now also be made to the details of the sectional representation shown in FIG. 3.

In order to limit to a specific angular sector the relative rotary movements of the piston 54 in relation to the output gear wheel 48 which are possible when there is an additional pulling or pushing moment in the front-axle drive train 12, the sleeve-like casing piece 64 of the piston 54 is provided with sector-shaped inner grooves 67 and 68. These grooves 67 and 68 are symmetrical relative to a radial longitudinal mid-plane 69 and have an angular width of 90° in the exemplary embodiment illustrated.

Sector-shaped stop ribs 71 and 72 are engaged with the inner grooves 67 and 68 of the piston casing 64, are themselves symmetrical relative to the mid-plane 73 of the output gear wheel 48, extending at right angles to the mid-plane 69 of the piston 54 in the illustration of FIG. 3, and have an angular width of 75°. Thus, starting from the azimuthal middle position of the piston 54 relative to the output gear wheel 48 is a middle position shown in FIG. 3 and corresponds to the complete freedom of the torsion rod 66 from torsional stress. The piston 54 can rotate a maximum of 7.5° in relation to the output gear wheel 48 azimuthal relative movements in the clockwise direction and in the anti-clockwise direction. A first inner annular groove 74 and the outer cylindrical surface of the piston 54 define an annular inlet-pressure space 76. A radial housing duct 77 connects the space 76 to a control-pressure outlet 78 of the auxiliary-pressure source 46 of FIGS. 1 and 2.

A second outer annular groove of the valve housing 52 and the outer cylindrical surface of the piston 54 define a first annular outlet-pressure space 79 of the sensor valve 51, with which a first pressure outlet 81 of the valve 51 communicates, as shown in FIG. 2. The piston 54 and an annular gasket 82, which forms the limitation of the valve housing 52 on the end face and through which passes centrally the joint connection piece 83 connecting the piston 54 to the cardan shaft 21 of the front-axle drive train, define, with the valve bore 57, a second annular outlet-pressure space 84, with which a second pressure outlet 86 of the sensor valve 51 communicates.

The piston casing 64 is equipped with passage ducts 87 and 88 which, in the representation according to FIG. 3, are aligned with one another and which communicate with the inlet-pressure space 77 of the sensor valve 51. In the end portion 62 of the bearing-shaft 63, of the output gear wheel 48, there are narrow longitudinal grooves 89 and 91 which, as seen in the radial direction, are open outwards and are open towards the valve piston 54 in the axial direction. In the position of the piston 54 relative to the output gear wheel 48, shown in FIG. 3, grooves 89 and 91 are both shut off from the radial passage ducts 87 and 88 of the valve-piston casing 64. By relative rotation of the piston 54 and of the output gear wheel 48 of the power take-off gear 14, grooves 89 and 91 can come into communication with the respective radial passage ducts 87 and 88 of the piston 84.

In the positions of maximum rotary deflections of the piston 54 and of the output gear wheel 48 of the power take-off gear 14 relative to one another determined by the form of the stop elements 67, 71 and 68, 72, either one longitudinal groove 89 or the other longitudinal groove 91 of the bearing-shaft 63 of the output gear wheel 48, with a maximum overlap of its cross-section, is in communication with one passage ducts 87 or the other passage duct 88 of the piston casing 64.

The piston 54 is also equipped with a first overflow duct 92 which is L-shaped in the representation according to FIG. 2 and which communicates with the first annular outlet-pressure space 79 of the sensor valve 51. When the longitudinal groove 91, at the bottom according to FIG. 3, of the bearing shaft 63 of the output gear wheel 48 of the power take-off gear 14 comes into communication with the lower radial passage duct 88 and the first overflow duct 92, it puts the first outlet-pressure space 79 in communication with the inlet-pressure space 76. Thus the pressure medium can flow from the auxiliary-pressure source 46 to the pressure outlet 81 of the valve 51.

Furthermore, the piston 54 is equipped with a second overflow duct 93 which extends obliquely in the representation according to FIG. 2 and which communicates with the second outlet-pressure space 84 of the sensor valve 51. When the longitudinal groove 89, at the top according to FIG. 3, of the bearing-shaft end portion 62 of the output gear wheel 48 comes into communication with the corresponding passage duct 87 of the piston 54, the second overflow duct 93 connects the inlet-pressure space 76 of the sensor valve 51 to its second outlet-pressure space 84. Thus, pressure medium can now flow from the inlet-pressure space 76 of the valve 51 to the second pressure outlet 86 of the latter.

Flow branches 94 and 96 lead respectively from the pressure outlets 81 and 86 of the sensor valve 51 to the pressure-medium supply tank 99. These flow branches 94 and 96 have high flow resistances of a specific, preferably identical amount, determined by diaphragms 97 and 98. In the various positions of the sensor valve 51, that is to say the various possible deflections of its piston 54 relative to the output gear wheel 48 of the power take-off gear 14, corresponding to the various possible operating and load stages of the drive train, pressure medium flows through either one or the other of the two flow branches 94 and 96. Accordingly, as seen in the direction of flow of the pressure medium, a dynamic pressure builds up in front of the diaphragm 97 or diaphragm 98 of the first or second flow branch 94 or 96.

In order to monitor the torque-dependent operating positions of the sensor valve 51 or the dynamic pressures building up in the flow branches 94 and 96, an electrical differential-pressure switch 101 of a known design and with two pressure inlets 102 and 103 is provided. Pressure inlet 102 is connected to the first flow branch 94 between the first pressure outlet 81 and the diaphragm 97, and the second pressure inlet 103 is connected to the second flow branch 96 between the second pressure outlet 86 of the valve 51 and the diaphragm 98.

The differential-pressure switch 101 has a first voltage output 104 and a second voltage output 106. At the first voltage output 104, a voltage output signal with a high logical signal level is transmitted when the pressure in the first flow branch 94 is higher than in the second flow branch 96 by an amount corresponding to a predetermined threshold value, and a signal with a low logical signal level is transmitted when the pressure in the second flow branch 96 is higher than in the first flow branch 94. At the second voltage output 106 of the differential-pressure switch 101, an output signal with a high logical signal level is transmitted when the pressure in the second flow branch 96 is higher than in the first flow branch 94 by a predetermined threshold value, and a signal with a low logical signal level is transmitted when the pressure in the first flow branch 94 is higher than in the second flow branch 96. When the pressure on both flow branches 94 and 96 are equally low, both outputs 104 and 106 are low logical signal levels.

For a further explanation of the functioning of the torque sensor 51 and of the pressure/voltage converter 101, it will be assumed that, during forward motion, the output gear wheel 48 of the power take-off gear 14 is driven in the counter-clockwise direction, that is to say the direction of the arrow 107 in FIG. 3. At the same time, even when only the rear-axle drive train 11 is used to propel the vehicle, the multiple-disc clutch 13 is subjected to a slight closing pressure which is limited by a relief valve 108 of the auxiliary-pressure supply source 46, and which is fed into the control-pressure space 44 of the multiple-disc clutch 13 via the solenoid valve 43 located in its basic or zero position shown in FIG. 2. This produces a moderate clutch engagement sufficient to take up "torque-free" the output gear wheel 48 and the front-axle drive train 12 connected to the latter via the valve piston 54.

In this operating state, the torsion resistance of the torsion rod 66 is sufficient to retain the bearing shaft 63 of the output gear wheel 48 and the piston 54 of the sensor valve 51 in the mutual position relative to one another which corresponds to FIG. 3. In this position, the two flow branches 94 and 96 are shut off from the pressure inlet 77 of the sensor valve 51. In this case, the differential-pressure switch 101 transmits a logic low (0-volt) signal at each of the two outputs 104 and 106.

When the front-axle drive train 12 is connected as a result of the change-over of the solenoid valve 43 to its through-flow one position, the control-pressure space 44 of the multiple-disc clutch 13 is connected to the high-pressure outlet 109 of the auxiliary-pressure source 46. The multiple-disc clutch 13 is thereby closed with a maximum degree of engagement and, in the exemplary embodiment illustrated, a distribution of the torque to the rear-axle drive train and the front-axle drive train 12 in a ratio of 1:1 is obtained. At the same time, the output gear wheel 48, under load, rotates relative to the valve piston 54 in the direction of the arrow 107, until the sector-shaped stop ribs 71 and 72 rest by means of their front flanks 71′ and 77′ against the opposite cheeks 67′ and 68′ of the sector-shaped grooves 67 and 68 of the piston casing 64. The valve piston 54 is thereby coupled positively to the output gear wheel 48.

When the sensor valve 51 is in this operating position, the second flow branch 96 communicates with the pressure inlet 77 of the valve 41, and the differential-pressure switch 101 transmits a logic low signal at its first output 104 and a logic high signal at its second output 106.

When the vehicle 10, with the front-axle drive train now connected, starts to corner, thus giving rise to a tendency for the front wheels 27 and 28 to accelerate in the driving direction, the piston 54 now experiences a rotary deflection relative to the output gear wheel 48, again as seen in the direction of the arrow 107. The rear stop edges 71″ and 72″ of the stop ribs 71 and 72 now come up against the groove flanks 67″ and 68″ facing them, and the first flow branch 96 is shut off. The differential-pressure switch 101 accordinglY transmitting a logic high output signal at its first output 104 and a logic low output signal at its second output 106. When the vehicle is in this operating state and the sensor valve 51 is in the corresponding operating position, the solenoid valve 43 is controlled by control unit 41 to return to its basic zero position, that is to say the clutch 13 is released.

The possibility of a build-up of inadmissibly high stresses in the drive train 12 during cornering in reverse, corresponds to that "safe" signal combination which the differential-pressure switch 101 generates for forward motion straight ahead. Also, the safe output-signal combination of the differential-pressure switch 101 generated for reversing in a straight line corresponds to the possibility of the build-up of excessively high stresses in the front-axle drive train 12 during cornering in forward motion.

Thus, to utilize the output signals from the differential-pressure switch 101 for disconnecting or connecting the front-axle drive train 12 according to the particular situation, it is still necessary to take into account the driving direction of the vehicle 10, namely in forwards or in reverse.

Figure 4:
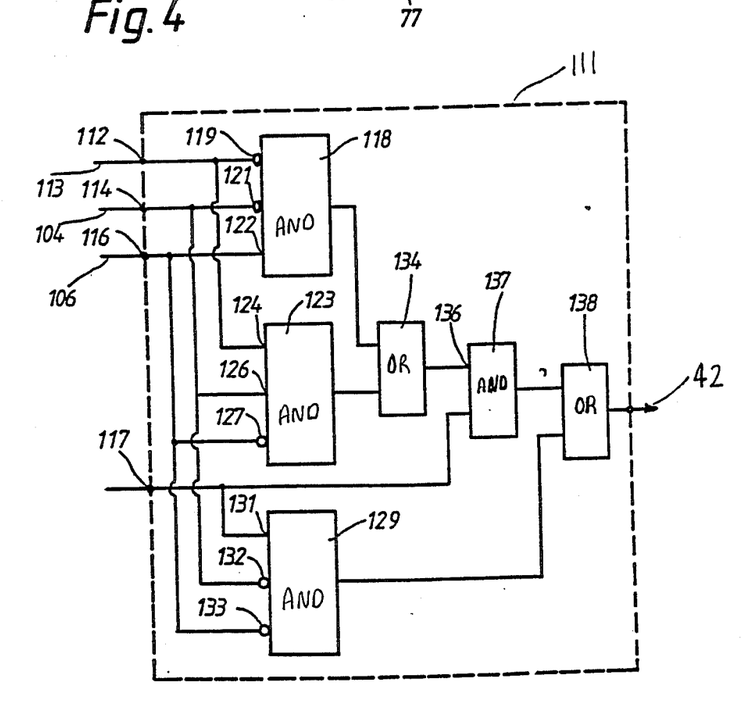
FIG. 4 is a schematic diagram of a linking circuit provided within the framework of the electronic control unit of the device according to FIGS. 1 and 2, for generating the control signals necessary for activating the clutch according to a particular situation.

FIG. 4 illustrates a possible design of a logic circuit 111 which is provided within the electronic control unit 41 and which generates signals in a sequence and with a duration corresponding to the particular need and intended for activating the solenoid valve 43 to connect and disconnect the front-axle drive train 12 to and from the rear-axle drive train 11.

The following signals are fed to this linking circuit 111 at any one of four inputs:

At a first input 112, the logic circuit 111 receives the output signal of a driving-direction transmitter 113, which is present as a signal with a high logical signal level when the vehicle 10 moves in reverse and is present as a signal with a low (0-volt) logical signal level when the vehicle 10 moves straight ahead The output signals from the differential-pressure switch 101 which are transmitted at the outputs 104 and 106 are fed to the logic circuit 111 at a second input 114 and a third input 116 respectively. At a fourth input 117, the logic circuit 111 receives as a high-level signal the signal generated internally in the electronic control unit 41, and this determines the duration of the period for which the front-axle drive train 12 is to be connected to the rear-axle drive train 11 in each case. The connection period signal at input 117 is generated by well known slip detector logic in control unit 41 when the slip in the rear axle drive train 11 exceeds a predetermined value. The period is of the order of a few seconds.

The logic circuit 111 contains a first 3-input AND-gate 118, to which the output signal from the driving-direction transmitter 113 is set at a first inverting input 119, the output signal transmitted at the first voltage output 104 of the differential-pressure switch 101 is fed at a second inverting input 121 and the output signal transmitted at the second voltage output 106 of the differential-pressure switch 101 is fed at a third non-inverting input 122. The output signal from AND-gate 118 is therefore a high-level output signal only when the vehicle 10 moves straight ahead and that signal combination is present at the two outputs 104 and 106 of the differential-pressure switch 101 which signals a uniform distribution of the torque in the forward direction to the two drive trains 11 and 12 with the pressure in the second flow branch 96 being greater than the pressure in the first flow branch 94.

The logic circuit 111 also contains a second 3-input AND-gate 123, to which the output signal from the driving-direction transmitter 113 is fed at a first non-inverting input 124, the output signal transmitted at the first voltage output 104 of the differential-pressure switch 101 is fed at a second non-inverting input 126 and the output signal transmitted at the second voltage output 106 of the differential-pressure switch 101 is fed at a third inverting input 127. Thus, the output signal from AND-gate 123 is a high-level output signal when and only when the vehicle moves in reverse and that signal combination is present at the two voltage outputs 104 and 106 which, as regards this driving situation, signals a uniform distribution of the torque to the rear-axle drive train 11 and the front-axle drive train 12 with the pressure in the first flow branch 94 being greater than the pressure in the second flow branch 96.

A third 3-input AND-gate 129 of the logic circuit 111 receives at a first non-inverting input 131 a connection-period signal generated internally by the electronic control unit 41 and received at the fourth input 117, at the second inverting input 132 the signal transmitted at the first voltage output 104 of the differential-pressure switch 101 and at a third inverting input 133 the signal transmitted at the second voltage output 106 of the differential-pressure switch 101.

The output signal from the third AND-gate 129 is thus a high-level signal, suitable for activating the solenoid valve 23 so that it assumes its through-flow one position and consequently for connecting the front-axle drive train 12, when and only when the connection control signal received at the connection-period input 117 of the logic circuit 111 is present as a high-level signal and the valve piston 54 assumes, relative to the output gear wheel 48 of the power take-off gear 14, a position which corresponds to that of FIG. 3 and in which the two flow branches 94 and 96 are shut off from the pressure inlet 77 of the sensor valve 51.

The output signals from the first AND-gate 118 and from the second AND-gate 123 are fed, via a first OR-gate 134, to one input 136 of a 2-input AND-gate 137. The connection-period signal received at the input 117 of the logic circuit 111 is provided as the other input 138 of AND-gate 137.

The output signals from AND-gate 137 and the output signals from the third AND-gate 129 are fed, via a further OR element 138, to the output of the logic circuit 111 which forms the control output 42 of the electronic control unit 41.

As indicated diagrammatically in FIG. 1, the switch, by means of which voltage is supplied to a reversing light when the reversing gear is selected, can be used as the driving-direction transmitter 113.

The auxiliary-pressure source 46 can be a pressure supply unit which is provided on the vehicle 10, for example for a hydraulic power steering or a level-regulating facility. The auxiliary-pressure source 46 includes an accumulator 142 chargeable to high pressure by means of a pump 139 via a pressure-controlled accumulator charging valve 141. An outlet 109 of the auxiliary-pressure source 46 is maintained at a high pressure level required for closing the clutch 13 is provided. An outlet 78 of the auxiliary-pressure source 46 is maintained at a moderate pressure level suitable for operating the torque sensor valve 51 and for subjecting the clutch 13 to low pressure. The outlet pressure for outlet 78 is branched off from the high-pressure outlet of the pump 139 by a flow-regulating valve 143 and is maintained at the appropriate low level by the relief valve 108.

It is also expedient if the four-wheel drive is cut off when the operating brake is actuated. As indicated diagrammatically in FIG. 1, the brake-light switch 144 can be used to generate a control signal appropriate for this purpose.

Although the present invention has been described and illustrated in detail, it is to be clearly understood that the same is by way of illustration and example only, and is not to be taken by way of limitation. The spirit and scope of the present invention are to be limited only by the terms of the appended claims

What is claimed:

1. Control device for the intermittent change-over of a vehicle drive from two-wheel drive vis a permanently driven vehicle axle to four-wheel drive by closing of an electrically or electrohydraulically controllable clutch in a power take-off gfear, in the closed state of hich the permanently active drive train is coupled to the connectable drive train acting on further vehicle wheels, and there being an electronic control means for a processing of electrical output signals froms peed sensors, characteristic of the circumferential speed of the wheels belonging to the respective vehicle axles, and generating control signals necessary for controlling the clutch, to change-over when the drive slip of at least one of the wheels of the permanently driven vehicle axle exceeds a predetermined threshold value, further comprising:

torque direction sensor means for generating output siganls with an alternative logical signal level which are characteristics of the two possible alternative directions of the torque effective in the connectable drive train; and driving-direction sensor means for generating output signals with an alternative logical signal level which are characteristics of the alternative forward and reverse driving directions; and wherein said electronic control means includes (1) first means which receives further signals from said torque direction sensor means and said driving direction sensor means; (2) second means which generates a control signal for aminimum period of activation to control said clutch to assume its closed state when the slip threshold value is exceeded; (3) third means which maintains said control signal at a signal level necessary to maintain the clutch closed for an extended period of time when the output signals form the torque direction sensor indicates that the torque in the connectable drive train has a direction representing an acceleration of the vehicle in accordance with the driving direction of the vehicle as indicated by the signals from the driving-direction sesnor; and, (4) fourth means which changes said contorl signal to a signal level necessary for the release of the clutch when the output signals form the torque direction sensor indicates that the torque in the connectable drive train has a direction representing a deceleration of the vehicle in accordance with the driving direction of the vehicle as indicated by the signals from the driving-direction sensor.

2. A control device according to claim 1, wherein the torque direction sensor means comprises:

a three/three-way sensor valve means controllable for assuming an alternative throughflow position as a result of alternative directions of flux of the torque effective in the connectable drive train, and having a pressure inlet connected to a control-pressure source and two pressure outlets, said value means in a middle position corresponding to a torque-free state of the connectable drive train, shutting off said two pressure outlets from the pressure inlet and, in two throughflow positions, alternatively connecting one of said two pressure outlets to the pressure inlet and shutting off the other pressure outlet from the pressure inlet; and a pressure/voltage converter means for generating different electrical output signals characteristic of the three alternative throughflow positions of the sensor valve means.

3. A control device according to claim 2, wherein the sensor valve means is a three/three-way rotary-slide valve, having housing incorporated in the housing of the power take-off gear, and having a piston arranged rotatably in the housing and coaxially relative to an output gear wheel of the power take-off gear, said piston on the one hand is supported on the output gear wheel in the aximuthal direction via at least one torsional resilient means for generating restoring forces increasing counter to relative rotary movements of the piston and output gear wheel of the power take-off gear and in proportion to the relative deflections, and on the other hand is connected positively and fixedly in terms of rotation to a cardan shaft coupling the power take-off gear to the differential gear of the vehicle axle connectable to the permanently active drive train; and said valve means includes stop means for limiting to an angular sector the rotary deflections of the piston and of the output gear wheel, within which the piston can assume relative to the output gear wheel a middle position neutral in terms of torque, in which the two pressure outlets of the valve are shut off from the pressure inlet, and can be rotated in the opposite direction relative to the output gear wheel into end positions, corresponding to maximum values of the throughflow cross-section of the valve in the alternative throughflow positions.

4. A control device according to claim 3, wherein said resilient means which builds up the restoring forces counter to relative rotations of the piston and of the output gear wheel is a torsion rod connected fixedly to the piston and to the output gear wheel of the power take-off gear.

5. A control device according to claim 4, wherein the torsion rod is made in one piece with the piston of the sensor valve means and is connected fixedly in terms of rotation to the output gear wheel by an end portion projecting into a bore located in an output-side shaft piece of the output gear wheel of the power take-off gear.

6. A control device according to claim 2, wherein the pressure/voltage converter means comprises:
two flow branches each start from one of the pressure outlets of the sensor valve means and each lead to a supply tank of the control-pressure source via a throttle member of specific flow resistance, and
differential-pressure switch means connected between said two flow paths for transmitting an electrical high-level signal and low-level signal at a first output and at a second output alternatively, depending on which of the two flow branches has a higher dynamic pressure than the other, said output signals being provided to said electronic control means.

7. A control device according to claim 6, wherein said electronic control means includes:
a first three-input AND-gate which at an inverting input receives the output signal from the direction sensor as a low-level signal for forward motion and as a high-level signal for reverse motion, at a second inverting input receives as a high-level signal the first output signal of said switch means characteristic of the pulling moment in the connectable drive train and at a non-inverting input receives as a high-level signal the second output signal of said switch means, characteristic of the pushing moment in the connectable drive train;
a second three-input AND-gate, to which are fed the output signals from the direction sensor at a first non-inverting input, the first output signal from the switch means characteristic of the pulling moment in the connectable drive train at a second non-inverting input and the second output signal from the switch means characteristic of the pushing moment in the connected drive train at an inverting input;
a third three-input AND-gate, to which the signal from the electronic control unit determining the period of activation of the connectable drive train is fed as a high-level signal at a first non-inverting input and the first and second output signals of the switch means characteristic of the pulling and pushing moments in the connectable drive train are fed at two inverting inputs;
a first OR-gate to which the output signals from the first and second three-input AND-gates; and
a two input AND-gate to which the signal from the first OR-gate is fed at its first input and the signal determining the connection period of the connectable drive train is fed at a second input; and
a second OR-gate, to which the output signals from the two-input AND-gate and from the third three-input AND-gate are fed as input signals, and by which the closing of the clutch is triggered by a high-level output signal from the second OR-gate.

8. A control device according to claim 7, wherein said controllable clutch includes a pressure-controlled clutch, to which the control pressure is supplied by a solenoid valve controllable by the output signal from the second OR-gate to couple the connectable drive train to the permanently activated drive train.

9. A control device according to claim 1, wherein said electronic control means includes:
first logic means for maintaining, within the extended period of activation, said control signal at said signal level necessary for closing said clutch for a first logic signal level from both said torque direction sensor means and said driving direction sensor means, and
second logic means for maintaining, withthe extended period of activation, said control signal at said signal level necessary for releasing said clutch for a second logic signal level from both said torque direction sensor means and said driving direction sensor means.

10. A control device according to claim 9, wherein:
said torque direction sensor means generates a null logic signal when neither direction of torque is present, and
said electronic control means includes a third logic means for maintaining, within said extended period of activation, said control siganl at said level necessary for closing said clutch for a null logic signal from said torque direction sensor means.

* * * * *